United States Patent [19]
Mor et al.

[11] Patent Number: 6,146,295
[45] Date of Patent: Nov. 14, 2000

[54] ENCAPSULATED ROLLER FOR HELICAL BEARING SURFACES

[76] Inventors: John Matthew Mor, Box 124 230 Ampe Dr., Paynesville, Minn. 56362; Duane Otto Watt, 29024 650th Ave., Litchfield, Minn. 55355

[21] Appl. No.: 09/104,950

[22] Filed: Jun. 25, 1998

[51] Int. Cl.[7] .............................. F16H 59/00; F16H 61/00
[52] U.S. Cl. .................................................. 474/13; 474/19
[58] Field of Search .................................. 474/8, 11, 12, 474/13, 15, 17, 19

[56] References Cited

U.S. PATENT DOCUMENTS

| | | | |
|---|---|---|---|
| 4,360,353 | 11/1982 | Hattori et al. | 474/15 |
| 4,523,917 | 6/1985 | Schildt | 474/19 |
| 4,585,429 | 4/1986 | Marier | 474/19 |
| 5,328,413 | 7/1994 | Robert | 474/13 |
| 5,403,240 | 4/1995 | Smith et al. | 474/19 |
| 5,516,332 | 5/1996 | Robert | 474/13 |
| 5,516,333 | 5/1996 | Benson | 474/19 |

*Primary Examiner*—David A. Bucci
*Assistant Examiner*—Matthew A. Kaness
*Attorney, Agent, or Firm*—David George Johnson

[57] ABSTRACT

A variable speed belt drive bearing assembly including an enclosed helical ramp assembly or torque sensing helix (4) which is mounted on the driven or secondary clutch (20). The helix (4) includes a plurality of ramps (10) that include both an upper bearing surface (13) and a lower bearing surface (9). This arrangement ensures that the torque transferring roller or button (18) is always in contact with either one or both of the surfaces. The cover (68) of the driving or primary clutch assembly (65) includes an enlarged opening (61) to permit the mounting of a sleeve (60) which slides over the engine clutch shaft (66).

8 Claims, 7 Drawing Sheets

ENCAPSULATED ROLLER FOR HELICAL BEARING SURFACES

FIELD OF THE INVENTION

This invention relates generally to belt driven clutch systems, and more particularly to an enclosed bearing surface for use with the secondary clutch of a belt driven power train.

DESCRIPTION OF RELATED TECHNOLOGY

A variable speed belt drive is a type of transmission commonly used with internal combustion engines developing fifty to two hundred horsepower at shaft speeds of up to approximately 10,000 revolutions per minute. Such belt drives are commonly used on snowmobiles, and permit operation from low velocities to speeds exceeding one hundred miles per hour. The belt drive typically includes a driving clutch having a shaft which is coaxial with the output shaft of the vehicle's engine. The driving or primary clutch is formed to include a stationary and a fixed sheave, which together define a pulley around which a belt may travel. The belt also travels around a driven or secondary clutch pulley that transfers the engine's power to the output shaft driving the vehicle.

An example of a variable speed belt drive of this type is disclosed in U.S. Pat. No. 3,939,720, issued to Aaen et al. The effective radius of both the primary and the secondary pulley may be varied. The ratio of the primary pulley radius to the secondary pulley radius determines the ratio of engine rotational speed to the output shaft rate of rotation. If the primary clutch radius is small compared to the secondary clutch, the output or jackshaft will turn at a rate that is slower than the engine speed, resulting in a relatively low vehicle speed. As the ratio of the primary and secondary clutch radius approaches 1:1, the jackshaft speed will be approximately equal to the engine or crankshaft speed. Finally, as the primary pulley radius becomes greater than the radius of the secondary clutch, an overdrive condition exists in which the jackshaft is turning at a greater rate than the engine crankshaft.

Ideally, an engine will deliver power in a linear manner and the transmission will deliver all of the available engine power to the jackshaft regardless of the vehicle's speed or load. Unfortunately, this is not the case with either real world engines or transmissions. Instead, a typical engine delivers its maximum power over a narrow range or band of relatively high crankshaft speeds, with power falling off measurably on either side of that band. An optimum transmission would permit the engine to operate within that band regardless of the load on the engine. Typically, the maximum "power band" has a range on the order of 500 rpm. The engine driven primary clutch is therefore mounted to the power source and in theory has the job of maintaining the engine rpm at a value where the most power is being produced by the engine. The primary clutch also has the job of controlling the engagement and disengagement of the engine from the load (the track in the case of a snowmobile) in order to start and stop vehicle movement. The secondary clutch (driven clutch) is attached to the load (through the jackshaft, gears and track) and in theory has the job of changing the ratio of the two clutches as the load varies. This function is performed by the torque sensing helix, which can be considered as the heart of the secondary clutch. An example of such a secondary clutch is disclosed in U.S. Pat. No. 5,516,333, issued to Benson.

As the load to the secondary clutch increases, the torque sensing helix will balance the power being received from the engine and the load, causing a downshift to occur if the load exceeds the input power. The secondary clutch sheaves will move closer together, resulting in a lower gear ratio and allowing the engine to maintain the necessary operating rpm of the crankshaft. If the load on the secondary clutch decreases, the torque sensing helix will balance the power being received from the engine and upshift the clutches to a higher ratio if the available engine power exceeds the load. The sheaves of the secondary clutch will open, allowing the engine to maintain the desired operation rpm. In practice, however, the torque sensing helix frequently fails to perform its intended task in every situation.

As a typical snowmobile encounters deeper or softer snow, thereby increasing the load, the helix senses this condition and downshifts the secondary clutch, thereby maintaining engine rpm as intended. Similarly, a sudden application of full throttle from a complete stop causes the momentarily unloaded track to spin and the clutch to upshift. As the track begins to encounter the mechanical resistance of the ground, the secondary clutch senses the increasing load and automatically downshifts so that the engine rpm does not decrease. If all of the throttle and load changes were to occur gradually, the theoretical system might work well in practice.

However, as the sheaves open and close on each clutch, the belt is only transferring force to about thirty percent of the sheave circumference. The remainder of the sheave circumference is relatively unloaded, resulting in the creation of a moment arm which is tending to spread the sheaves apart adjacent to the loaded portion of the belt while forcing the unloaded portion of the sheaves together. This bending moment tends to tilt the sheaves in the region adjacent to the crankshaft and jackshaft, creating a binding or cocked orientation between the sheaves and the shaft instead of a low friction parallel interface about which the sheaves may freely rotate. The net effect is that the belt is frequently oscillating between an overly tight and an overly loose condition as the binding is momentarily increased and then relieved. Instead of shifting smoothly, the net effect is a clutch that is stepping abruptly between a stuck and unstuck condition.

Given a constant belt force and machining tolerances, the cocked or tilted condition between opposed sheaves in the secondary clutch increases as the diameter of the shaft bushing decreases. A small diameter shaft bushing also creates other problems. The movable sheave is supposed to carry or resist half of the belt load, the fixed sheave carrying the remaining half of the belt force. When the jackshaft bushing diameter is substantially smaller than the diameter of the torque sensing helix, however, the helix itself becomes a primary load bearing element, a job for which it was never designed.

Another problem with state of the art secondary clutch construction relates to the construction of the torque sensing helix. A spring is used to apply a tensile force to the rollers or buttons that reside between the helix and the movable sheave. The spring prevents the clutch sheaves from separating too quickly in an unloaded condition. The torsional tension of the spring is also supposed to keep the rollers or buttons in contact with the helical ramp during decreasing load conditions. In practice, however, the buttons or rollers actually leave the surface of the helix, usually when the snowmobile track has momentarily left the ground and the load is very low. When the track comes back into contact with the ground and the load is thereby suddenly reintroduced to the drive train, the roller buttons recontact the helix with a considerable and destructive force. At that instant, the secondary clutch is set at an excessively high ratio and so the engine crankshaft immediately drops below the desired rpm range.

SUMMARY OF THE INVENTION

The present invention addresses some of the problems with state of the art clutch design in at least two ways. First, the bushing which surrounds the shaft (either primary or secondary clutch shafts or both) is constructed with a larger diameter. A larger diameter sleeve, preferably constructed of hardened steel, is formed to fit around and slide over the existing shaft, thus increasing the effective diameter of the shaft. A larger diameter oilite or fiber composite bushing is then formed or placed within the clutch cover in order to accommodate the enlarged shaft. If an existing clutch is being modified, an entirely new clutch cover may be formed which includes the larger bushing, and the old clutch cover can then be replaced. The effect of this modification is to increase the resistance of the shaft and cover bushing from tilting with respect to each other and hence decrease the possibility of binding or momentary seizing. The larger diameter shaft and bushing causing the load bearing portion of the sheaves to be displaced radially outward, thereby decreasing the magnitude of any bending moment induced on the sheaves due to the force of the belt bearing against the sheaves.

A second improvement afforded by the present invention is the provision of a second bearing surface for the torque sensing ramp of the secondary clutch. The torsion sensing helix is formed as a cylinder including a helical slot, thereby causing the rollers or buttons to be in physical contact with a load bearing surface at all time, rather than only when the load on the engine is increasing. During conditions of decreasing engine load, the present invention eliminates the need for the high torsional tension of the clutch spring to maintain contact between the helical ramp and the rollers. Rather, the buttons are constrained to be in contact with one of two opposed surfaces at all times regardless of spring tension or rate of change of the engine load. The high spring tensions typically used in secondary clutches are not necessary in the present invention. Torsional spring tension can be reduced to near zero, belt pressure being supplied by the compressive force of the spring. Secondary clutch flyweight mass can also be reduced in many cases, as will the occurrence of belt flutter. A benefit of the present invention occurs during those situations when the engine is relatively unloaded. Existing clutches provide only loose contact between the rollers and the helical ramp during this condition, causing the sheaves to separate and the clutch to thereby upshift to a ratio that is incorrect when the engine suddenly encounters a loaded condition. The present invention prevents this rapid and undesired upshifting, thereby more closely preserving the correct ratio for the loaded condition. The end result is that the engine is less likely to bog, the clutch will shift more smoothly, engine power will be more efficiently transferred, belt life will be increased and there will be less variation in engine speed for changing load conditions.

DETAILED DESCRIPTION OF THE PREFERRED EMBODIMENTS

Figure 1:
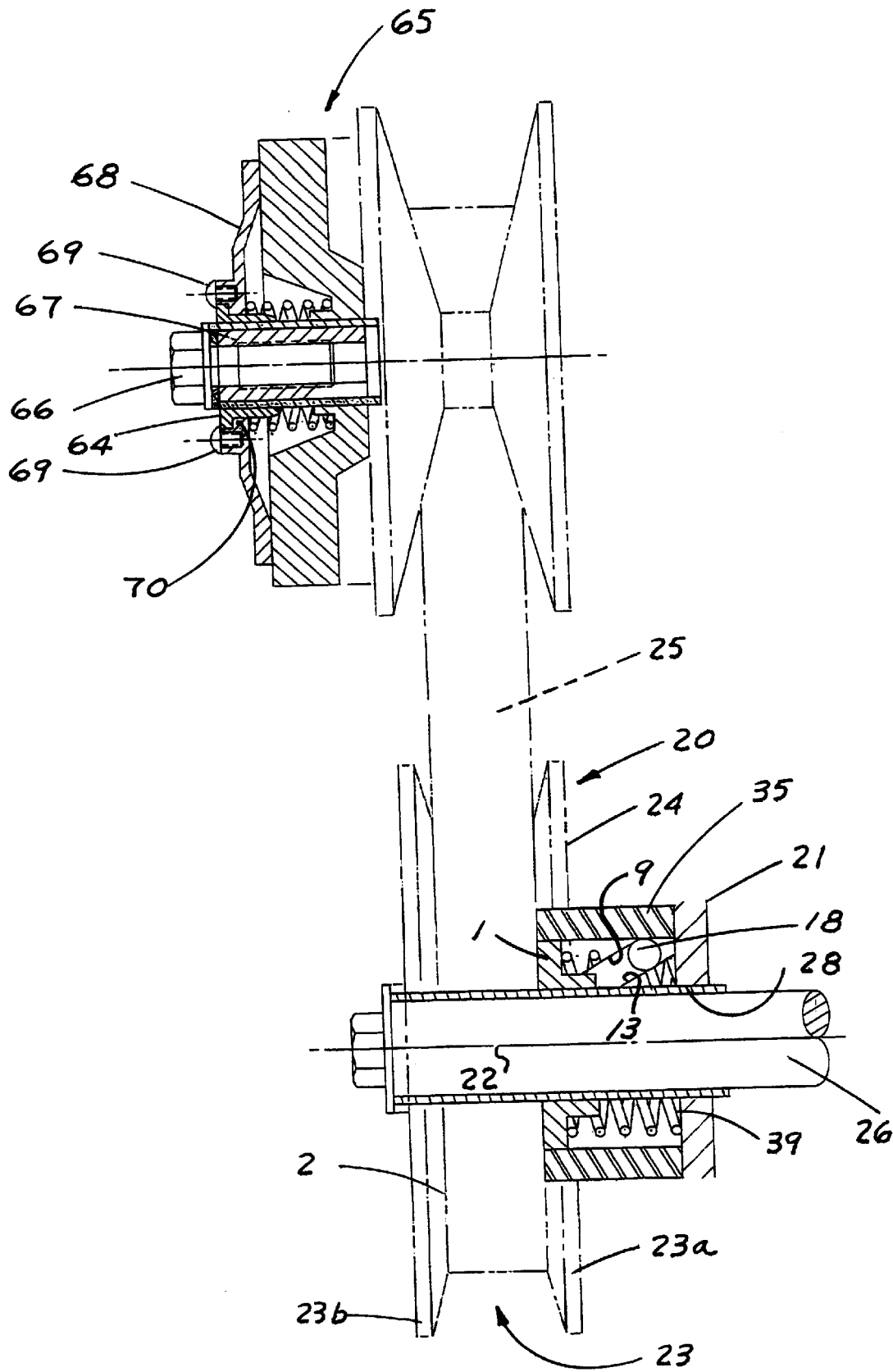
FIG. 1 is a side elevation, shown partly in section, of a variable speed belt drive constructed in accordance with the principles of the present invention.
Figure 3:
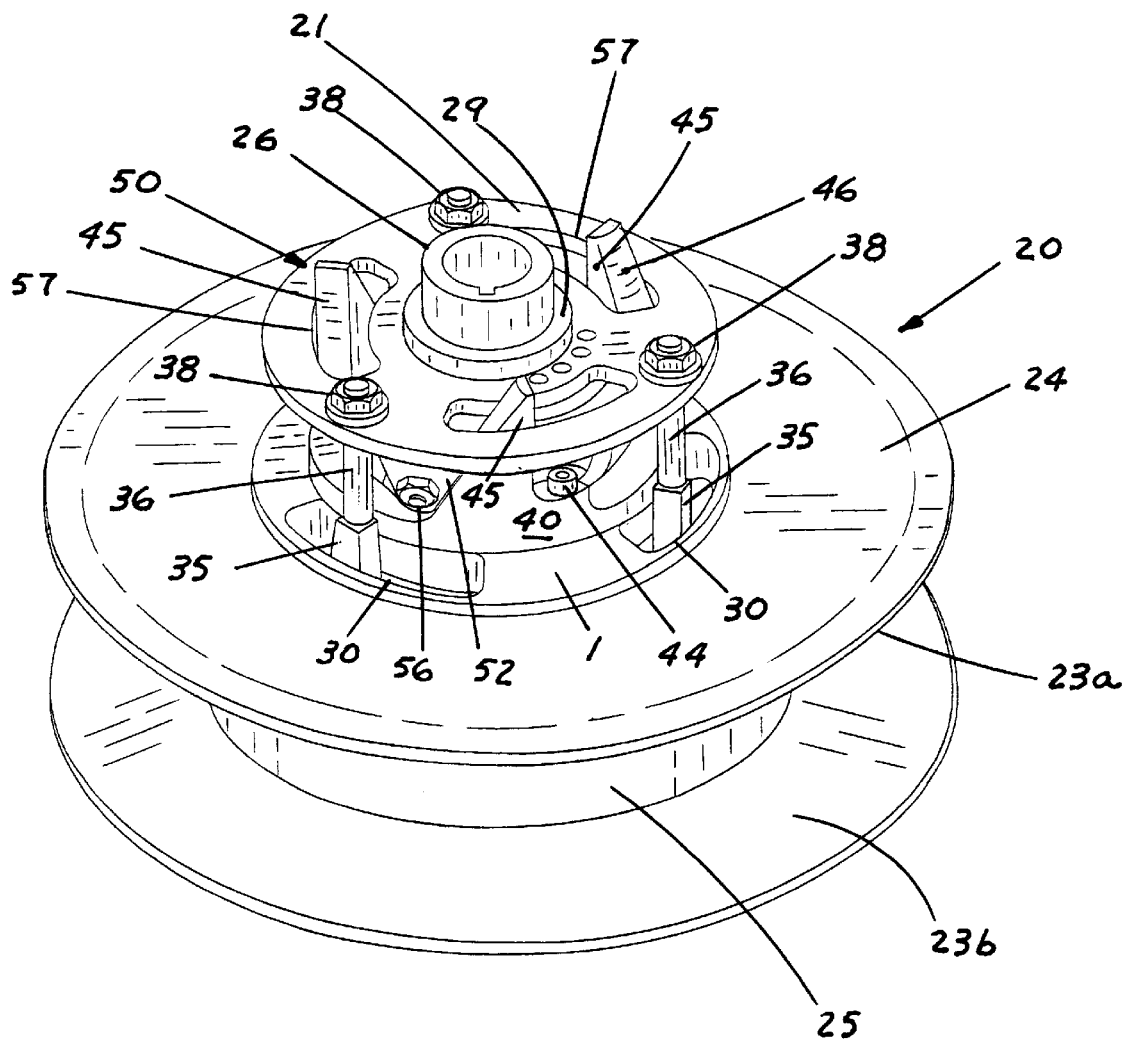
FIG. 3 is a perspective view of a prior art secondary clutch.

Referring first to FIG. 3, a state of the art driven (or secondary) clutch will be described in enough detail so that its modification to employ the features of the present invention can be understood. The driven clutch 20 includes an actuator or clutch cover plate 21 which is essentially parallel to to an upper or top face 24 of an upper pulley half 23a of a pulley 23. Pulley 23 includes upper pulley half 23a and lower pulley half 23b, which when closed together form a deep "V" shaped trough therebetween in which a drive belt 25 resides. In order to achieve pulley separation, thereby reducing the effective radius travelled by the drive belt 25 residing therein, the lower pulley half 23b includes three piers 35 which are each secured to a hub area 1 (see FIG. 1) at equally spaced intervals and equal radial distances from the lower pulley half longitudinal axis 22 (see FIG. 1). The piers 35 extend through arcuate openings 30 that are formed through the upper pulley half 23a hub area 1. The piers 35 each include a rod 36 that is coaxial therewith and that extend through the clutch cover plate 21. The clutch cover plate 21 also includes a center hole 28 (see FIG. 1) wherein a bushing 29 is pressed or otherwise affixed in place. The bushing 29 supports travel of a cylindrical jackshaft 26 that is coaxial with longitudinal axis 22. The straight cylindrical shaft 26 extends at a right angle to the clutch cover plate 21 and center hole 28, being secured to the upper pulley half 23a and slidably extending through lower pulley half 23b. The cylindrical shaft 26 extends at a right angle through center bushing 29 of cover 21, thereby allowing the shaft 26 to slide or translate relative to the clutch cover plate 21 during the operation of clutch 20.

Movement of the clutch cover plate 21 towards the upper pulley half 23a top face 24 is transferred through the connecting rods 36 and piers 35 to the lower pulley half 23b in order to spread the halves of pulley 23 apart and thereby increase the width of the "V" formed by the two opposed pulley halves 23a and 23b. In other words, the clutch cover plate 21 and pulley 23 are operated to move the clutch cover plate 21 towards the upper pulley half 23a top face 24. To provide for clutch cover plate 21 and lower pulley half 23b movement, the clutch 20 includes the radial and circumferentially equally spaced parallel piers 35 that are each positioned to extend at right angles upwardly from the hub area 2 (see FIG. 1) of the lower pulley half 23b. The piers 35 extend through arcuate holes 30 formed in the upper pulley half 23a. The piers 35 each include the smooth walled cylindrical rod 36 that extends axially from each pier top end. The rods 36 fit through holes in the cover plate 21 and are secured by nuts 38, thereby rigidly affixing cover plate 21 to lower pulley half 23b and causing cover plate 21 to slide along cylindrical shaft 26 so as to open or close the pulley 23.

In order to outwardly bias the clutch cover plate 21 such that the pulley halves 23a and 23b are closed together, a coil spring 39 (see FIG. 1) is placed so as to surround shaft 26. The ends of the coil spring 39 are arranged to engage, respectively, one of the holes 3 formed within cover plate 21 and the top face 24 of the upper pulley half 23a. The coil spring 39 thereby urges the cover plate 21 outwardly so that the halves of pulley 23 tend to come closer together. The bias of spring 39 must be overcome in order to urge the cover plate 21 towards the upper pulley half 23a, thereby spreading or enlarging the "V" formed by the opposed pulley halves. State of the art clutches employ a helix or cam cone 40 which includes tracks or surfaces 46 for guiding the cam follower assemblies 52 affixed to cam follower bearing plate 50.

Figure 2:
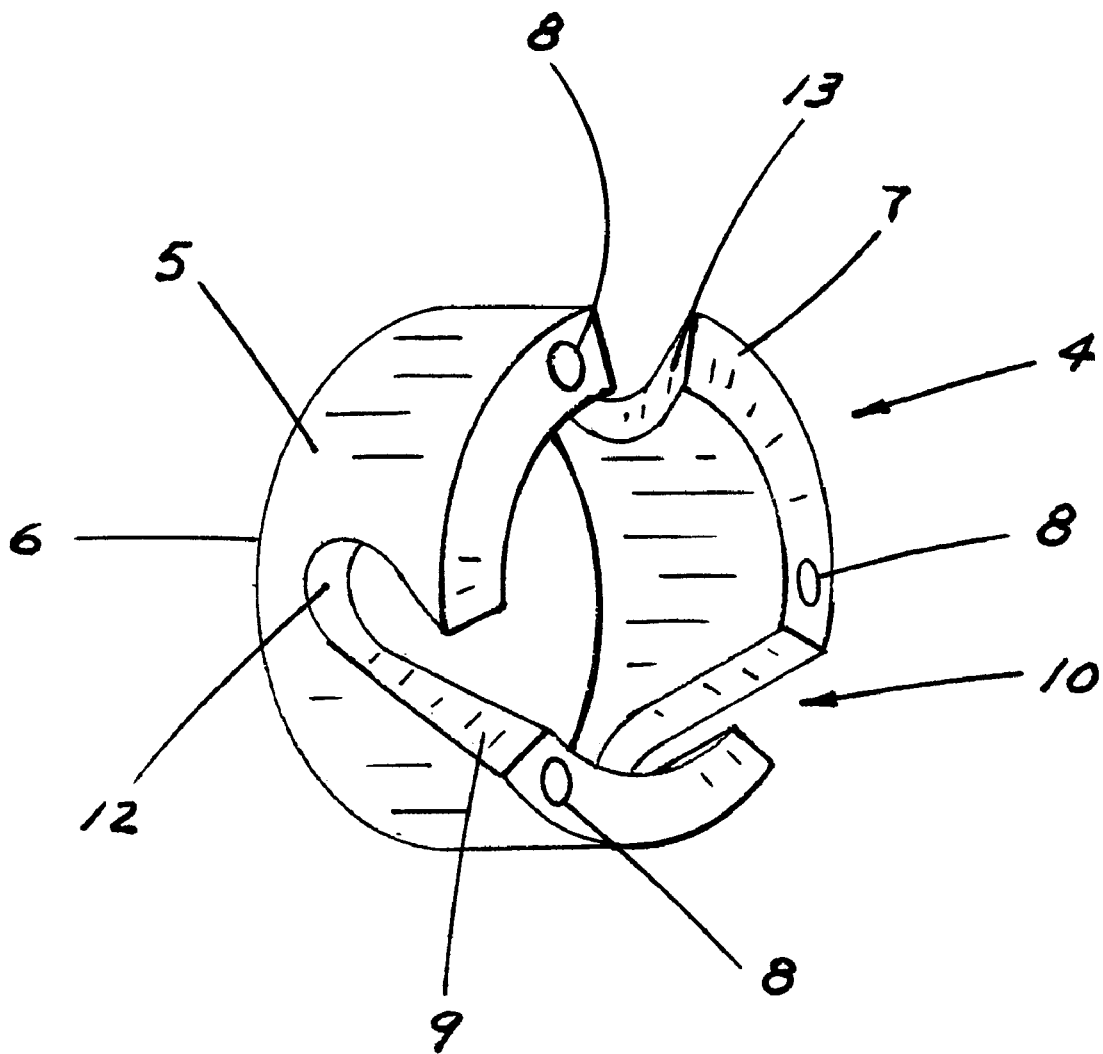
FIG. 2 is a perspective view of an encapsulated helical torque sensing ramp constructed according to the principles of the present invention.

Referring now to FIG. 2, the improved torque sensing helix 4 of the present invention will be described. The helix 4 is formed substantially as a right cylinder 5 having a bottom edge 6 and an upper surface 7. Extending axially through the cylinder are bores 8 which permit the cylinder to be affixed to the upper suface 24 of upper pulley half 23a by means of suitable fasteners (not shown). A helical ramp 10 is formed at 120 degree intervals within the sidewall 11 of the cylinder 5. Each of the three ramps 10 includes a bottom surface 9, a rounded end surface 12, and an upper surface 13.

Figure 5:
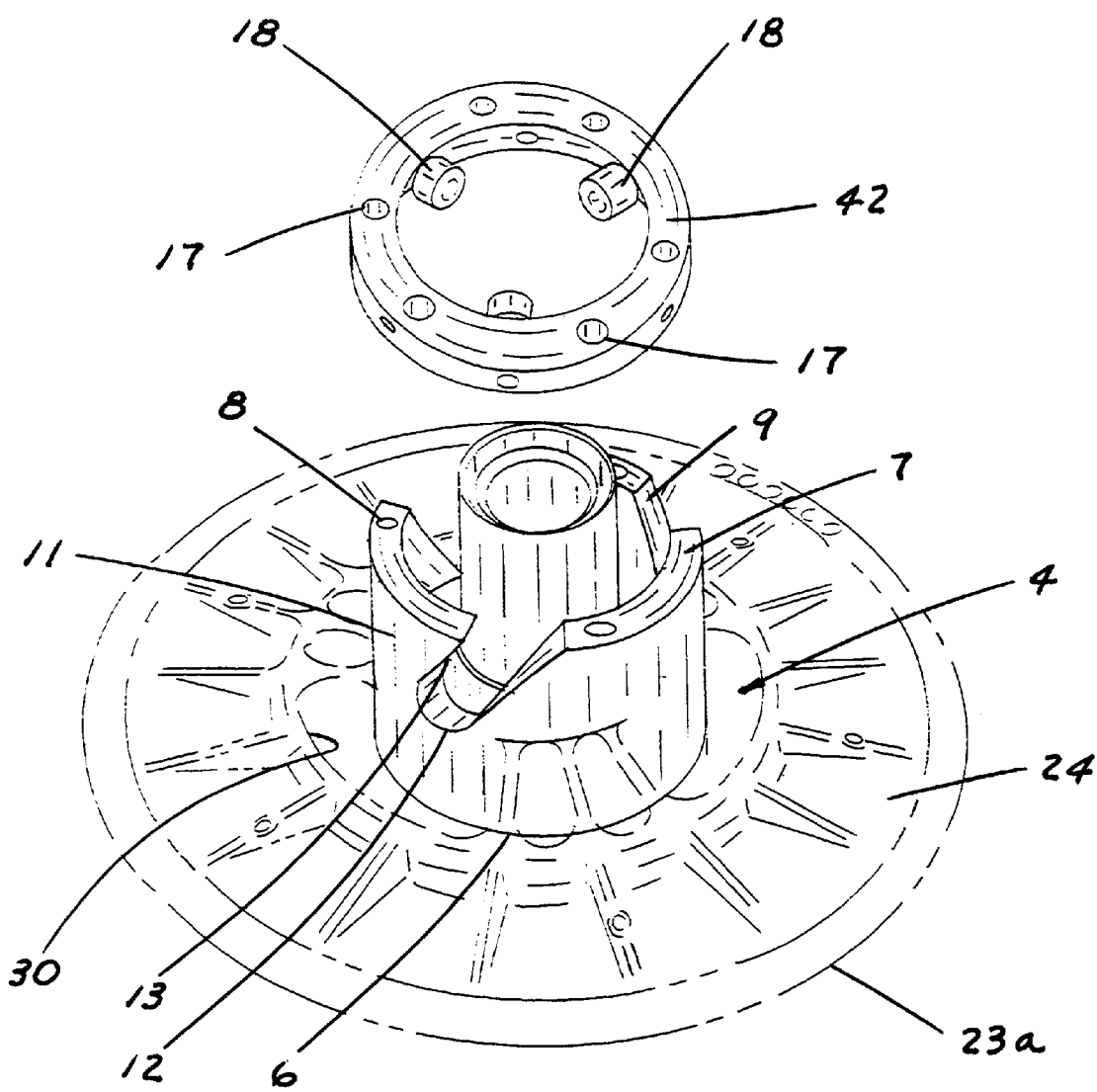
FIG. 5 is an exploded perspective view of some components of a secondary clutch constructed according to the principles of the present invention.
Figure 6:
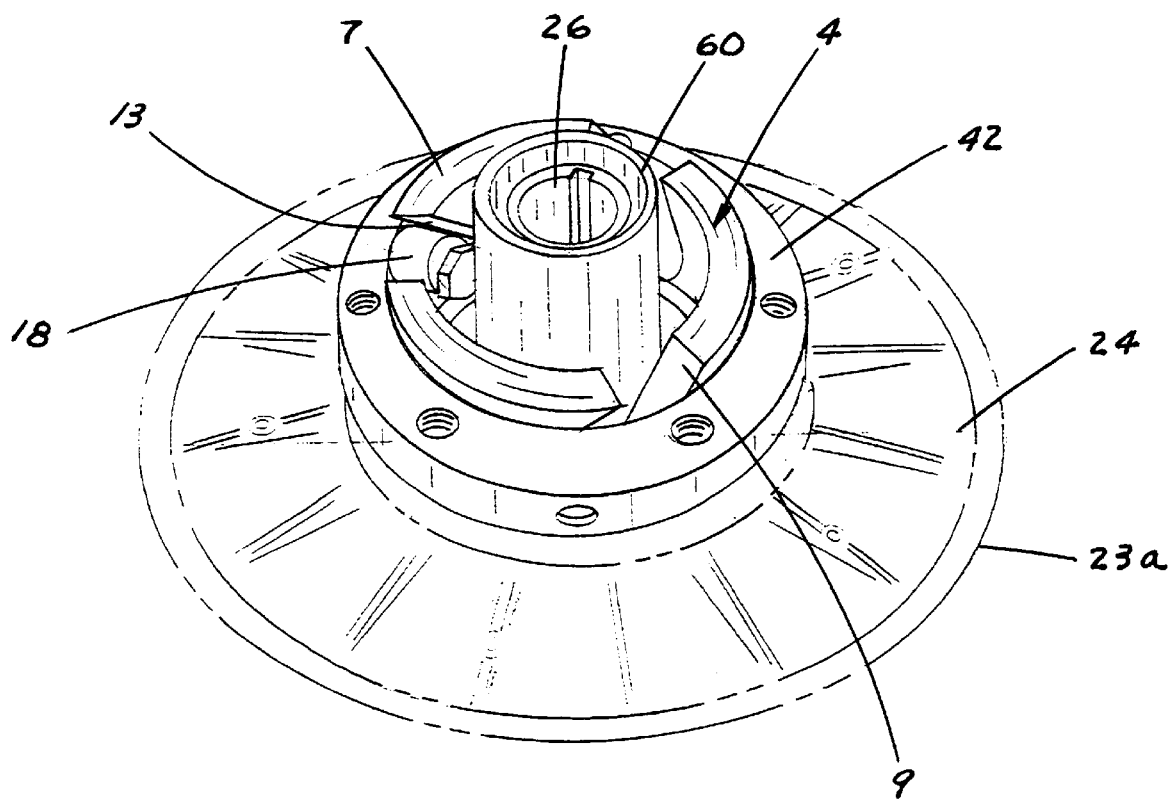
FIG. 6 is a perspective view showing the components depicted in FIG. 5 in an assembled configuration.
Figure 8:
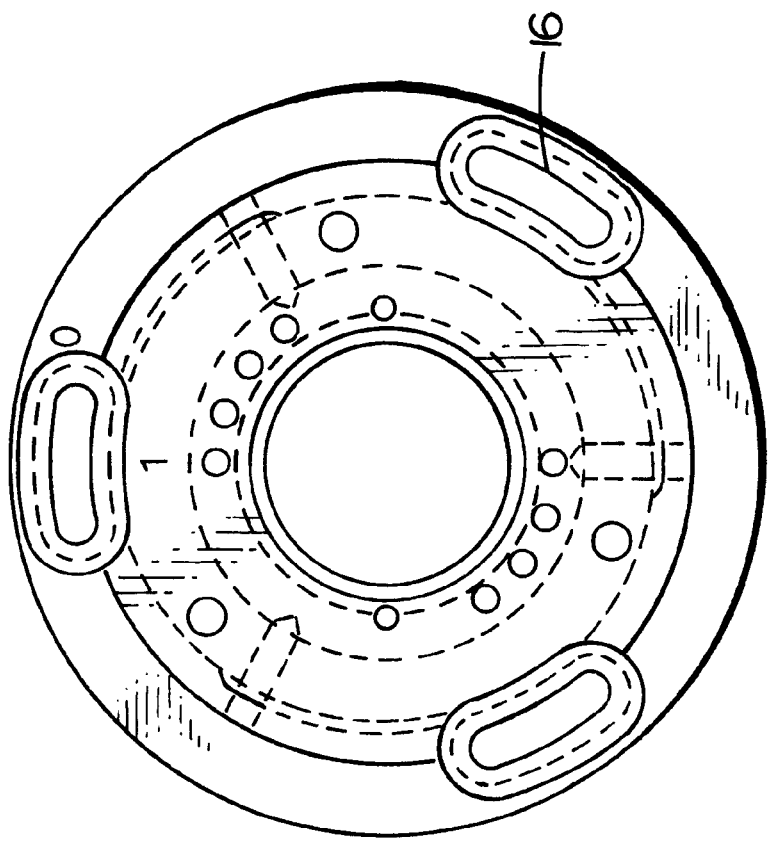
FIG. 8 is a plan view of the secondary clutch cover depicted in FIG. 7.
Figure 7:
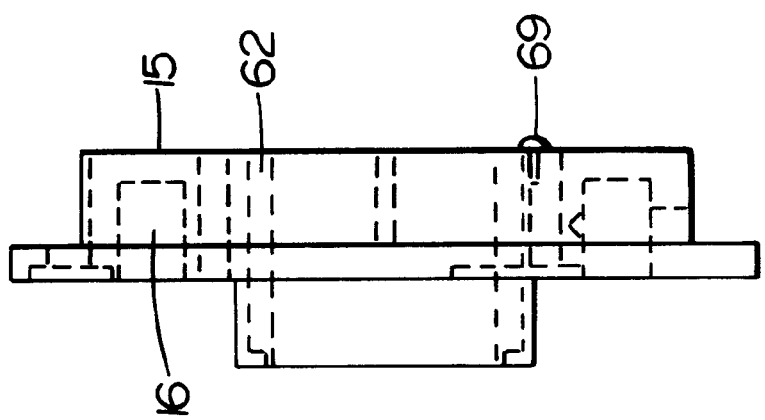
FIG. 7 is a side elevation of a secondary clutch cover constructed according to the principles of the present invention.

As seen in FIGS. 5, 7 and 8, a cam follower assembly 42 including rollers 18 is attached to a cover plate and spring adjuster 15. Cover plate 15 is formed to include elongated perforations or recesses 16. The recesses 16 are present to facilitate spring tension adjustments without removing the clutch cover 15. At least some of these regions 16 align with the bores 17 formed within cam follower assembly 42, and thereby permit the rods 36 of lower pulley half 23b to be fastened to the cover plate 15. The remaining cutouts 19 formed within the cover plate 15 are dimensioned to permit clearance from the torque sensing helix 4. Referring to FIG. 6, the position of the cam follower assembly 42 is shown with respect to the torque sensing helix 4 when the rollers 18 are near the bottom surface 12 of the helical ramp 10.

Figure 4:
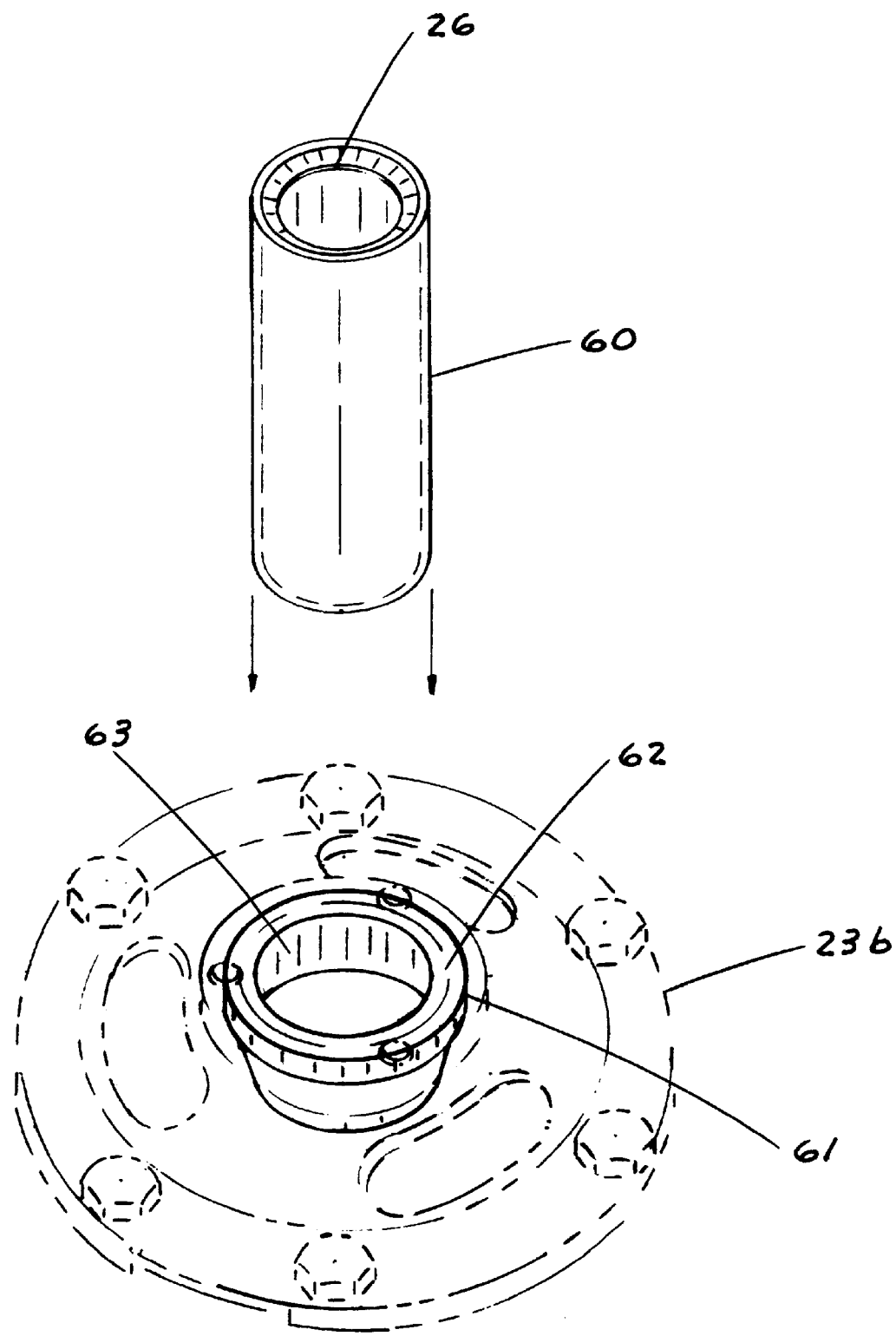
FIG. 4 is an exploded perspective view of a shaft sleeve and cover plate constructed according to the principles of the present invention.

Another feature of the present invention can best be appreciated by reference to FIG. 4. A sleeve 60 is formed to encircle the existing cylindrical clutch shaft 26. An enlarged opening 61 is formed within the clutch cover plate 23b so as to permit the placement of enlarged bearing 62. The bearing 62 diameter is selected in order to accommodate he inside diameter of the clutch spring 39, while the length of bearing 62 is selected so as to increase the available load bearing surface 63 and thereby diminish the possiblity of seizing or sticking. The combination of the sleeve 60 and bearing 62 also allows the rebuilding of a clutch that would normally be discarded because of a worn or damaged clutch shaft. Referring again to FIG. 1, an enlarged bearing can also be used to advantage in conjunction with the driving or primary clutch assembly 65. The engine primary clutch shaft 66 is fitted with a sleeve 67, thereby increasing its effective diameter. An enlarged bearing 64 is placed within the clutch cover plate 68 and held in place by suitable fasteners 69. Fasteners such as round head machine screws permit the bushing 64 to be held in place by the screw head and a lip 70 formed within the cover plate 68. This mounting method facilitates the replacement of the bushing 64 as it becomes worn.

While preferred embodiments of the present invention in a clutch assembly for a belt drive system have been shown and described herein, the present disclosure is only an example of the technology which is regarded as inventive. The present invention is suitable for a number of uses in addition to that of a snowmobile clutch, and variations to the clutch improvements described herein are possible without departing from the subject matter falling within the scope of the invention.

We claim:

1. A torque sensing assembly for use in a variable speed belt drive driven clutch in which the driven clutch is formed to include a belt residing between a fixed sheave and a movable sheave, the torque sensing assembly being rigidly affixed to the movable sheave, comprising:

(a) a cylindrical body portion formed substantially as a right cylinder, the right cylinder having a circumferential wall; and (b) a fixed sheave comprising a button;

(c) at least one substantially helical slot formed within the circumferential wall, the slot being adapted to receive the button, the button having a diameter and being rigidly affixed to the fixed sheave, the button being movable with respect to the slot, the button having opposing sides which are simultaneously constrained within the substantially helical slot such that lateral and nonhelical movement of the button within the slot is prevented.

2. The torque sensing assembly of claim 1, wherein three substantially identical slots are formed within the circumferential wall.

3. The torque sensing assembly of claim 2, wherein each of the slots has an upper surface and a lower surface, the upper and lower surfaces being opposed to each other in a spaced apart relationship defined by a distance that is greater than the diameter of the button.

4. The torque sensing assembly of claim 3, wherein each slot includes a bottom portion, the bottom portion being formed substantially as a semicircular region bridging the upper surface and the lower surface of the slot.

5. The torque sensing assembly of claim 4, wherein each slot has a longitudinal axis that follows a substantially helical path.

6. The torque sensing assembly of claim 5, wherein each slot is circumferentially spaced from each adjacent slot by approximately 120 degrees.

7. The torque sensing assembly of claim 6, wherein the torque sensing assembly is intergrally formed from a single ingot of aluminum.

8. The torque sensing assembly of claim 7, wherein the button always contacts some surface of the torque sensing assembly when the driven clutch is in an assembled state.

* * * * *